(12) United States Patent
Ginjpalli et al.

(10) Patent No.: US 7,324,554 B1
(45) Date of Patent: Jan. 29, 2008

(54) COMMUNICATION BANDWIDTH DISTRIBUTION SYSTEM AND METHOD

(75) Inventors: Hariprasad Ginjpalli, Cupertino, CA (US); Jayakumar Jayakumar, San Jose, CA (US); Durai Chinnaiah, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 848 days.

(21) Appl. No.: 10/702,997

(22) Filed: Nov. 5, 2003

(51) Int. Cl.
*H04J 3/16* (2006.01)
(52) U.S. Cl. .................. 370/468; 370/458; 370/437
(58) Field of Classification Search .................. None
See application file for complete search history.

(56) References Cited

U.S. PATENT DOCUMENTS

| | | | |
|---|---|---|---|
| 6,175,570 B1 | 1/2001 | Cukier et al. ............... 370/414 |
| 6,546,014 B1 | 4/2003 | Kramer et al. .......... 370/395.41 |
| 6,570,883 B1 * | 5/2003 | Wong .......................... 370/412 |
| 6,947,996 B2 * | 9/2005 | Assa et al. ................... 709/232 |
| 6,973,315 B1 * | 12/2005 | Miernik et al. ............ 455/452.2 |
| 7,072,344 B2 * | 7/2006 | Abdelilah et al. ....... 370/395.21 |
| 2002/0136200 A1 * | 9/2002 | St. John ....................... 370/352 |
| 2003/0007452 A1 * | 1/2003 | Gorti et al. .................. 370/229 |
| 2004/0042399 A1 * | 3/2004 | Bly et al. .................. 370/230.1 |
| 2004/0196788 A1 * | 10/2004 | Lodha ......................... 370/230 |

* cited by examiner

*Primary Examiner*—Bob A. Phunkulh
(74) *Attorney, Agent, or Firm*—Stolowitz Ford Cowger LLP

(57) ABSTRACT

An information communication routing system and method for dynamically determining and utilizing available communication bandwidth is presented. Free excess bandwidth on a scheduled link is measured dynamically and free available bandwidth is dynamically distributed to a queue. In one embodiment, a bandwidth availability tracking value is utilized to measure free excess bandwidth on a scheduled link and the free excess bandwidth dynamically distributed or assigned to a queue. A first packet size (e.g., fixed packet size) is added to the bandwidth availability tracking value whenever a link is scheduled in a calendar scheduling slot. A second packet size (e.g., actual size of the packet departed) is subtracted from the bandwidth tracking value whenever information is departed from a queue. If the bandwidth tracking value exceeds a threshold value (e.g., is positive) it indicates there is excess available bandwidth and the excess available bandwidth is assigned to a queue.

23 Claims, 6 Drawing Sheets

COMMUNICATION BANDWIDTH DISTRIBUTION SYSTEM AND METHOD

FIELD OF THE INVENTION

This invention relates to information communication. In particular, the present invention relates to a communication bandwidth distribution system and method.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity in analyzing and communicating data, ideas and trends in most areas of business, science, education and entertainment. Often these advantageous results are achieved through the use of distributed resources that communicate with each other over a network and it is usually desirable for the information to be communicated rapidly. However, it is often difficult to maximize utilization of available resources to achieve fast and efficient communication of information.

The rate at which information is communicated over a network is typically referred to as bandwidth. Tremendous growth in communication traffic due to a seemingly insatiable desire for new services has led to greater demand for increased bandwidth capabilities and is driving the rapid deployment of advanced communication networks. Traditional communication networks can include a variety of architectures utilizing numerous communication protocols such as Fiber Distributed Data Interface (FDDI), Dynamic Packet Transport (DPT), Packet Over Sonet (POS), Asynchronous Transfer Mode (ATM), Ethernet, token ring, Transmission Control Protocol/Internet Protocol (TCP/IP), plain old telephone system (POTS), Cable, Digital Subscriber Line (DSL), etc. The communication networks typically include switches coupled together by multiple communication links.

One traditional approach to communicating information via a network includes "cell switching" in which digital information is segmented into units called "cells" or packets that are transmitted from a source node to a destination node through a "connection" in a digital network. A communication link can communicate or carry a variety of different connections simultaneously. Accordingly, cells belonging to each connection are often handled or serviced differently at each switch in order to meet overall network goals.

Many traditional switches include a memory or buffer used for temporarily holding or storing information prior to transmission on a communication link. The memory is often arranged in logical queues which are used to separate information based upon different types of services and/or connections. For example, higher priority information (e.g., information required to be transmitted in real time) is associated with higher priority connections and stored in queues that have a higher priority of service. In some cases, a separate queue may be assigned to each connection. "Servicing" of a queue is usually accomplished by sending information (e.g., a packet) from that queue out "into" the network on a communication link. For example, the information packet is removed from its associated queue in the memory or buffer and forwarded on the network towards its final destination.

The information is usually forwarded in accordance with a scheme that determines when the information is sent. In advanced modern communication system nodes (e.g., switches) it is often desirable to support and take advantage of characteristics associated with multiple scheduling schemes. One traditional scheduling scheme is a rate based scheduling scheme which usually involves precise rate control. Another conventional scheduling scheme is a non-rate base scheduling scheme. Regardless of the scheduling scheme, it is usually important for information to be granted appropriate access to bandwidth on each link or port. For example, it is usually desirable for scheduling schemes to grant greater link access to high priority information while still ensuring that other information also obtains appropriate access to the link and is not shut out. Non-rate based scheduling schemes, such as round robin (RR) or weighted round robin (WRR), are usually relatively simple and typically work well for ports or communication links.

In addition to planning information communication between ports or links efficiently and fairly, it is usually desirable to distribute bandwidth efficiently and fairly between queues accessing a port when the port is active. Traditional approaches usually utilize a calendar based (e.g., "slotted wheel") approach for scheduling rate based flows associated with a queue. However, traditional calendar schemes often encounter difficulty in scheduling queues with varying rate connection flows. Traditional attempts at efficiently scheduling queues with varying rate connection flows are typically very complicated and cycle intensive. In addition, utilizing a calendar scheme to schedule queue connection flows involving different packet sizes on a link or port usually introduces difficulties in maximizing utilization of available bandwidth of the link.

SUMMARY

An information communication routing system and method for dynamically determining and utilizing available communication bandwidth is presented. In one embodiment, an information communication routing method routs information from a plurality of queues in a manner that maximizes utilization of available bandwidth on a port. Excess available bandwidth on a scheduled link is measured dynamically and excess available bandwidth is dynamically distributed to a queue. In one embodiment of a present invention information communication routing method, a bandwidth availability tracking value is utilized to measure excess available bandwidth on a scheduled link dynamically and distributes the excess bandwidth to a queue.

In one embodiment, the bandwidth availability tracking value is a bandwidth credit count. The bandwidth credit count is initialized to zero. A communication link and queues are scheduled based upon a rate (e.g., rate based scheduled on a plurality of rates r1, r2, r3, ... rn) in a slotted scheduling scheme (e.g., calendar scheduling scheme). In one exemplary implementation, the link scheduling is virtual since there is no data queued directly for the link. The link is scheduled in the slots based upon a fixed packet size and fixed rate (e.g., the maximum cumulative rate capacity of the link). A scheduling eligibility examination is performed and a link scheduling process is performed if a link is eligible. In one embodiment of the present invention, a link scheduling process includes incrementing a bandwidth credit count by a link packet size (e.g., predetermined fixed link packet size). The link is rescheduled for another slot based on the link packet size and the link rate (e.g., maximum link rate).

A determination is made if sufficient excess bandwidth is available to schedule a queue for the excess bandwidth. In one embodiment, a determination that there is available excess bandwidth is made if the bandwidth credit count exceeds a predetermined threshold value (e.g., is positive 128 bytes, 256 bytes, etc.). A determination is also made if an eligible queue is associated with rate based scheduling or excess based scheduling. A rate based schedule process is performed if the eligible queue is rate based scheduled and an excess slot based schedule process is performed if the eligible queue is excess based scheduled. The rate based schedule process and excess based process include departing a packet and decreasing the bandwidth credit count by the size of the departed packed. Rate based scheduling also includes rescheduling the queue based upon the rate and size of the packet that is departed.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Reference will now be made in detail to the preferred embodiments of the invention, an information communication routing system and method for dynamically determining and utilizing available communication bandwidth, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention facilitates efficient and effective utilization of available bandwidth. Present invention systems and methods track excess available bandwidth that is not being otherwise utilized. Information is communicated on the otherwise excess bandwidth in a dynamic flexible manner. For example, whenever a port or link is scheduled and a corresponding first queue does not have information to communicate, a second queue is dynamically selected and information from the second queue is communicated on the available bandwidth. In one embodiment, a present invention system and method supports multi-level hierarchical scheduling in a single calendar based scheduling scheme in a manner that maximizes utilization of available bandwidth.

Figure 1:
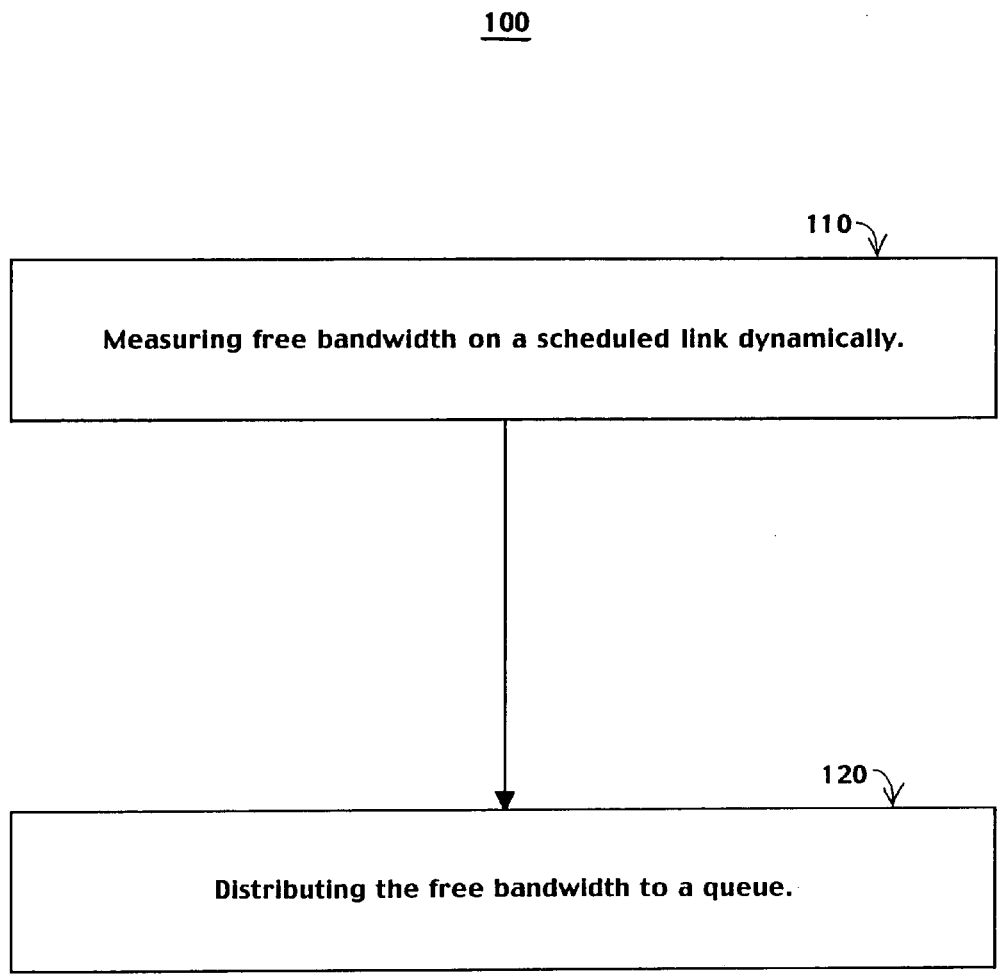
FIG. 1 is a flow chart of an information communication routing method in accordance with one embodiment of the present invention.

FIG. 1 is a flow chart of information communication routing method 100 in accordance with one embodiment of the present invention. Information communication routing method 100 dynamically determines and utilizes available communication bandwidth. In one embodiment, information communication routing method 100 routs information from a plurality of queues in a manner that maximizes utilization of available bandwidth on a link or port.

In step 110, excess available bandwidth on a scheduled link is dynamically measured. In one embodiment of the present invention, a bandwidth availability tracking value is utilized to dynamically measure excess available bandwidth on a scheduled link. In one exemplary implementation, a first packet size (e.g., a maximum fixed packet size associated with a port) is added to a bandwidth availability tracking value (e.g., a bandwidth credit count variable) whenever a port slot time is scheduled. A second packet size (e.g., the size of a packet that is actually sent) is subtracted from a bandwidth tracking value whenever a first queue is scheduled. The second packet is information from the first queue. Accordingly, if no information from the first queue is scheduled a value of zero is subtracted from the bandwidth tracking value. The first packet size and second packet size can be the same.

In one embodiment of the present invention, a calendar based scheduling scheme is utilized to schedule links and queue access to the link. For example, a time based "slotted wheel" tracking scheme is used to schedule a link and a queue. In one exemplary implementation, a fixed packet size and rate are used to schedule a link and the previous packet size and rate from a queue are used to schedule that queue. If a slot in the calendar or wheel is vacant (e.g., no queue information is scheduled for that time) but the link is scheduled during the corresponding slot, information from an eligible queue is forwarded during that time slot. In one exemplary implementation, a positive bandwidth tracking value indicates there is available bandwidth in a time slot that would otherwise be unused.

In step 120, excess available bandwidth is distributed to a queue. In one embodiment, if the bandwidth tracking value is above a predetermined threshold (e.g., is a positive 128 bytes, 256 bytes etc.) after subtracting the second packet size, information from a second queue is scheduled (e.g., in the next available slot) for departure (e.g., sent out on a network). It is appreciated that there are a variety of approaches to determining which queue is assigned to the excess available bandwidth. For example, the distributing can be based upon a weight distribution algorithm.

In one embodiment of the present invention, the port is rescheduled in a calendar scheduling scheme. The port rescheduling can be based upon a fixed packet size and a fixed rate (e.g., a maximum link rate). In one embodiment, the first queue is rescheduled in a calendar scheduling scheme. For example, the queue rescheduling can be based upon a size of a packet serviced and a connection rate.

Figure 2:
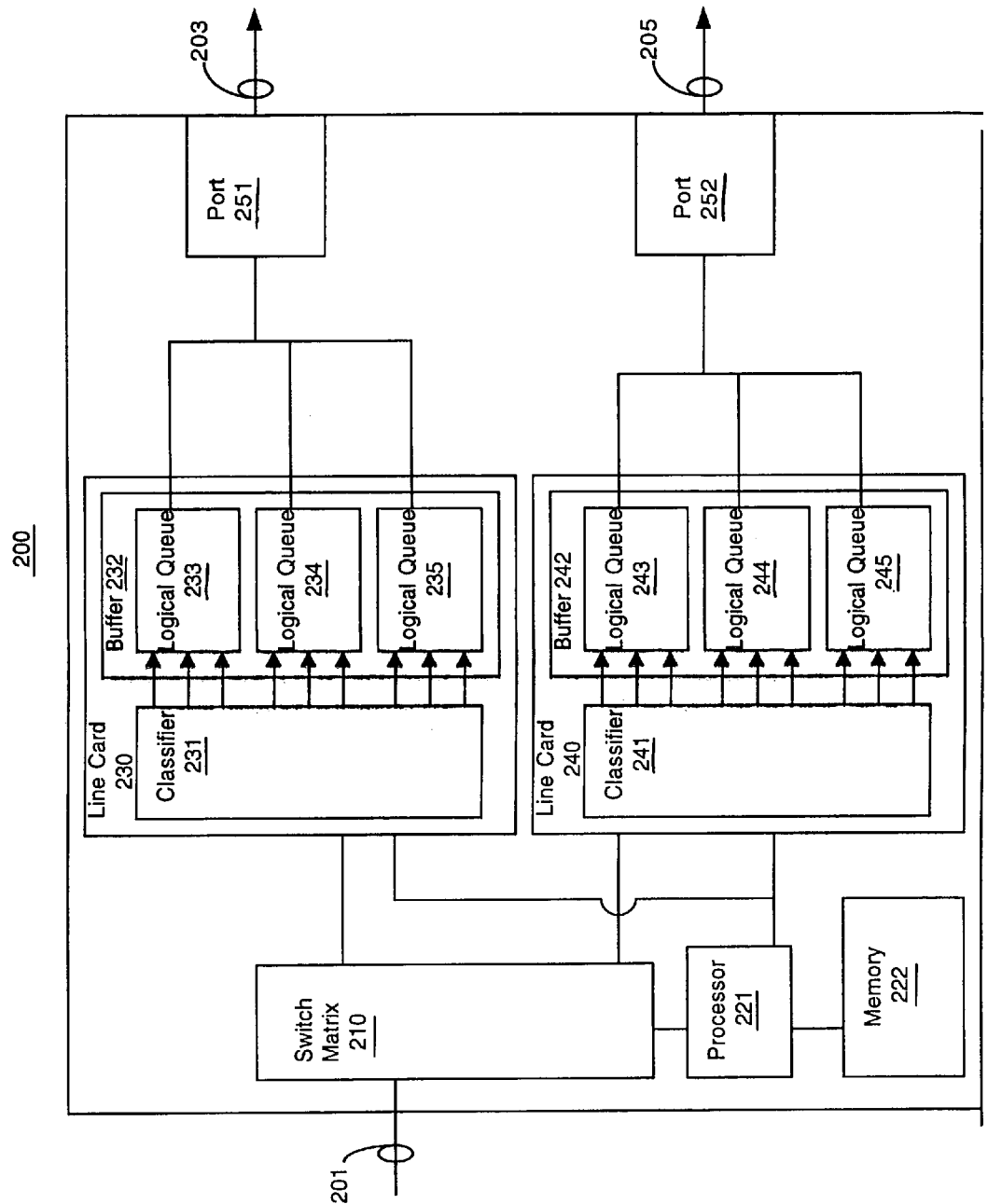
FIG. 2 is a block diagram of a router system in accordance with one embodiment of the present invention.

FIG. 2 is a block diagram of router system 200 in accordance with one embodiment of the present invention. Router system 200 includes switch matrix 210, processor 221, memory 222, line card 230, line card 240, link or port 251 and port 252. Processor 221 is coupled to memory 222, switch matrix 210, line card 230 and line card 240. Line card 230 is coupled to port 251 and line card 240 is coupled to port 252. Line card 230 includes classifier 231 and buffer 232 which includes logical queues 233, 234 and 235. Line card 240 includes classifier 241 and buffer 242 which includes logical queues 243, 244 and 245. It is appreciated that the present invention is readily adaptable for utilization in router systems of various configuration, including router systems with more than two line cards and two ports.

The components of router system 200 cooperatively operate to maximize utilization of free available bandwidth. Switch matrix 210 receives ingress or input information on line 201 and routes it to line card 230 or line card 240. The information routing through switch matrix 210 is directed by processor 221 based upon routing instructions and data stored in memory 222. Line card 230 and 240 organize information for delivery to ports 251 and 252. Classifiers 231 and 241 classify information based upon a type or class of information and forwards the information accordingly to a queue associated with that type or class of information. Buffers 232 and 243 are organized in a logical queues 233 through 235 and 243 through 245 respectively. The logical queues temporarily store information for communication via ports 251 and 252. Ports 251 and 252 forward the information on output lines 203 and 205 respectively.

Processor 221 also directs scheduling of information flows through line cards 230 and 240. Information from one of the plurality of queue buffers (e.g., 233, 234, 235, etc.) is scheduled to communicate information via a port (e.g., 251) if bandwidth is available. In one embodiment of the present invention, the scheduling is calendar based. For example, ports 251 and 252 are scheduled in a calendar scheduler based upon a fixed packet size and fixed communication rate and queues 233 through 235 and 243 through 245 are scheduled in the calendar scheduler based upon a serviced packet size and actual communication rate.

In one embodiment of the present invention, processor 221 also includes a register for storing a bandwidth availability tracking value or bandwidth credit value. The bandwidth credit valued can also be stored in a memory (e.g., memory 222). The port bandwidth credit value provides a dynamic indication of available link or port bandwidth. Information is communicated from a queue via port 251 or 252 if a corresponding port bandwidth credit value indicates bandwidth is available on the port. The port bandwidth credit value is increased when the port is scheduled and decreased when a queue is scheduled. The queue can be rate based scheduled or excess bandwidth based scheduled.

Figure 3:
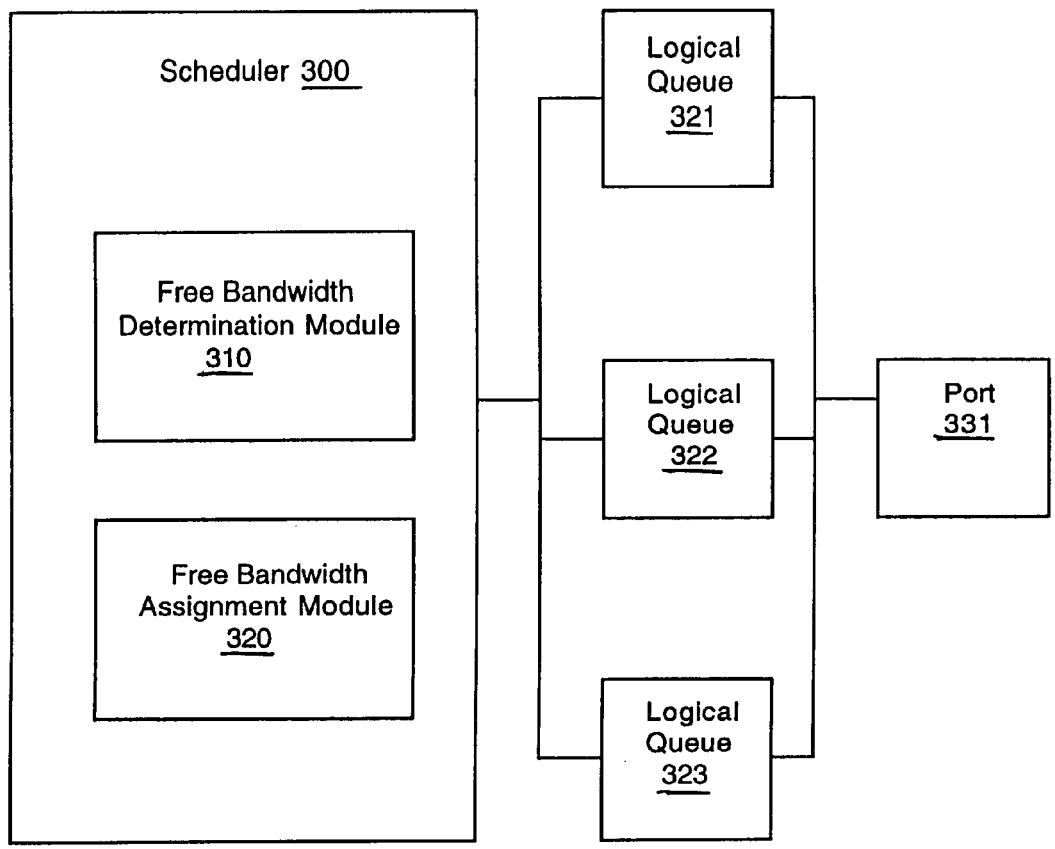
FIG. 3 is a block diagram of a free bandwidth scheduler in accordance with one embodiment of the present invention.

FIG. 3 is a block diagram of a free bandwidth scheduler 300 in accordance with one embodiment of the present invention. Free bandwidth scheduler 300 is utilized to schedule communication bandwidth, including link bandwidth that would otherwise be excess. It is appreciated that free bandwidth scheduler 300 can be implemented in a variety of configurations, including software, hardware and/or firmware. In one embodiment, free bandwidth scheduler 300 is implemented on a computer readable medium with instructions embedded therein for causing a processor to implement a free bandwidth utilization process.

Free bandwidth scheduler 300 comprises free bandwidth determination module 310 and free bandwidth assignment module 320. Free bandwidth determination module 310 determines if there is free bandwidth available (e.g., excess available bandwidth on port 331). Bandwidth assignment module 320 assigns a queue (e.g., queue 321, 322, or 323) to available bandwidth including available excess or free bandwidth. In one embodiment, bandwidth scheduler 300 performs a free bandwidth determination process which includes determining if bandwidth is available after assigning information for departure. In one embodiment, bandwidth scheduler 300 performs a free bandwidth assignment process which includes assigning information for departure on free or excess bandwidth.

Figure 4A:
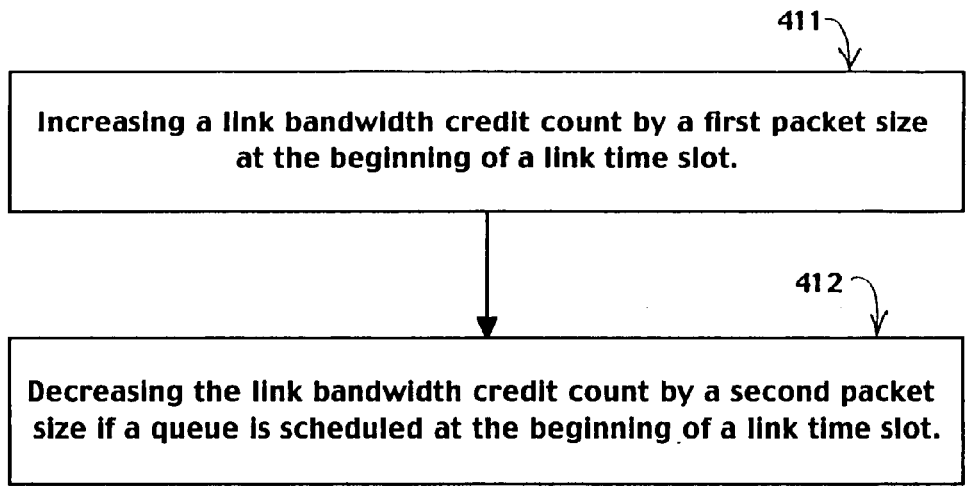
FIG. 4A is a flow chart of a free bandwidth determination process in accordance with one embodiment of the present invention.

FIG. 4A is a flow chart of free bandwidth determination process 410 in accordance with one embodiment of the present invention.

In step 411, a bandwidth credit count is increased by a first packet size at the beginning of a link time slot. The link or port is scheduled for a new slot by a fixed position. In one exemplary implementation the fixed position is based upon a fixed packet size and a fixed rate.

In step 412, the bandwidth credit count is decreased by a second packet size if a queue is scheduled in a link time slot. In one exemplary implementation, the queue is rescheduled in a new calendar scheduling slot based upon the size of the packet serviced and the connection rate. A positive bandwidth credit count indicates excess or free available bandwidth.

Figure 4B:
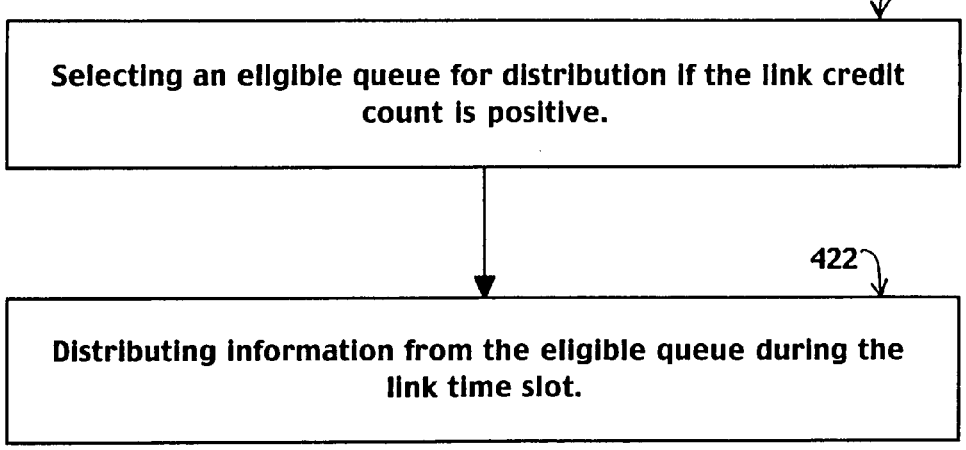
FIG. 4B is a flow chart of a free bandwidth assignment process in accordance with one embodiment of the present invention.

FIG. 4B is a flow chart of free bandwidth assignment process 420 in accordance with one embodiment of the present invention.

In step 421, an eligible queue for distribution is selected if the bandwidth credit count is positive. In one exemplary implementation, the queue choice is performed based upon a distribution algorithm for directing the sequence in which queues are chosen.

In step 422, information from the eligible queue is departed during the link time slot. In one embodiment, the information selected for distribution from the eligible queue is rescheduled on a future slot if the departed information was scheduled based upon a queue rate and is not rescheduled if the departed information was scheduled based upon excess bandwidth availability.

Figure 5A:
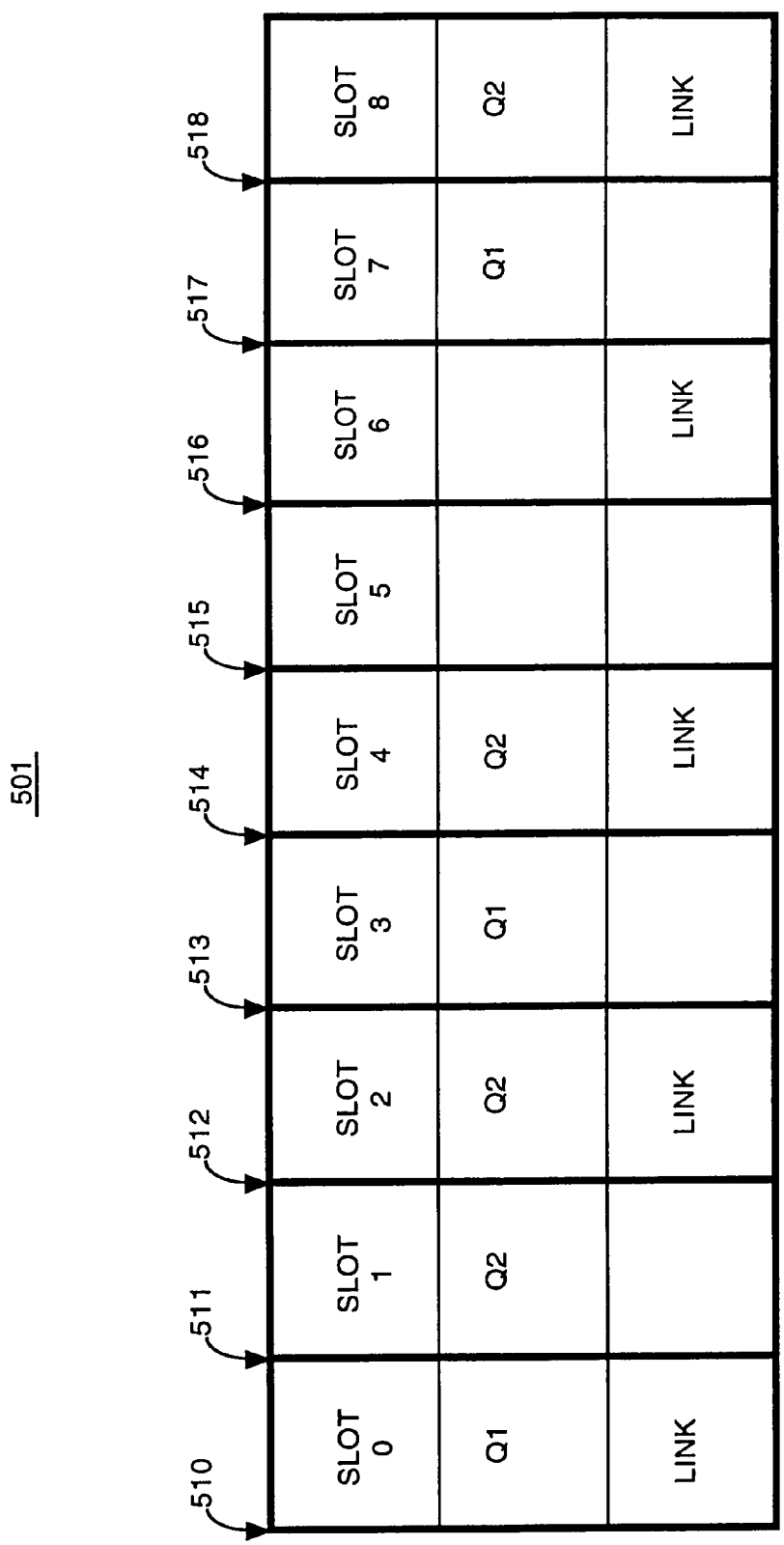
FIG. 5A is a block diagram of slotted scheduling scheme in accordance with on embodiment of the present invention.

FIG. 5A is a block diagram of slotted scheduling scheme 501 in accordance with on embodiment of the present invention. Slotted scheduling scheme 501 includes slots 0 through 8. Each slot 0 through 8 is associated with a start time 510 through 518 respectively. In one exemplary implementation, each slot is associated with a uniform period of time (e.g., e.g., 50 nano seconds, 1 second, etc.). Queues and a link are scheduled in the slots. For example, queue Q1 and the link are rate based scheduled in slot 0, queue Q2 and the link are rate based scheduled in slot 1, queue Q2 is excess bandwidth scheduled in slot 2, queue Q1 and the link are rate based scheduled in slot 3, queue Q2 is rate based scheduled in slot 4, queue Q1 and the link are rate based scheduled in slot 0, and queue Q2 is rate based scheduled in slot 1.

Figure 5B:
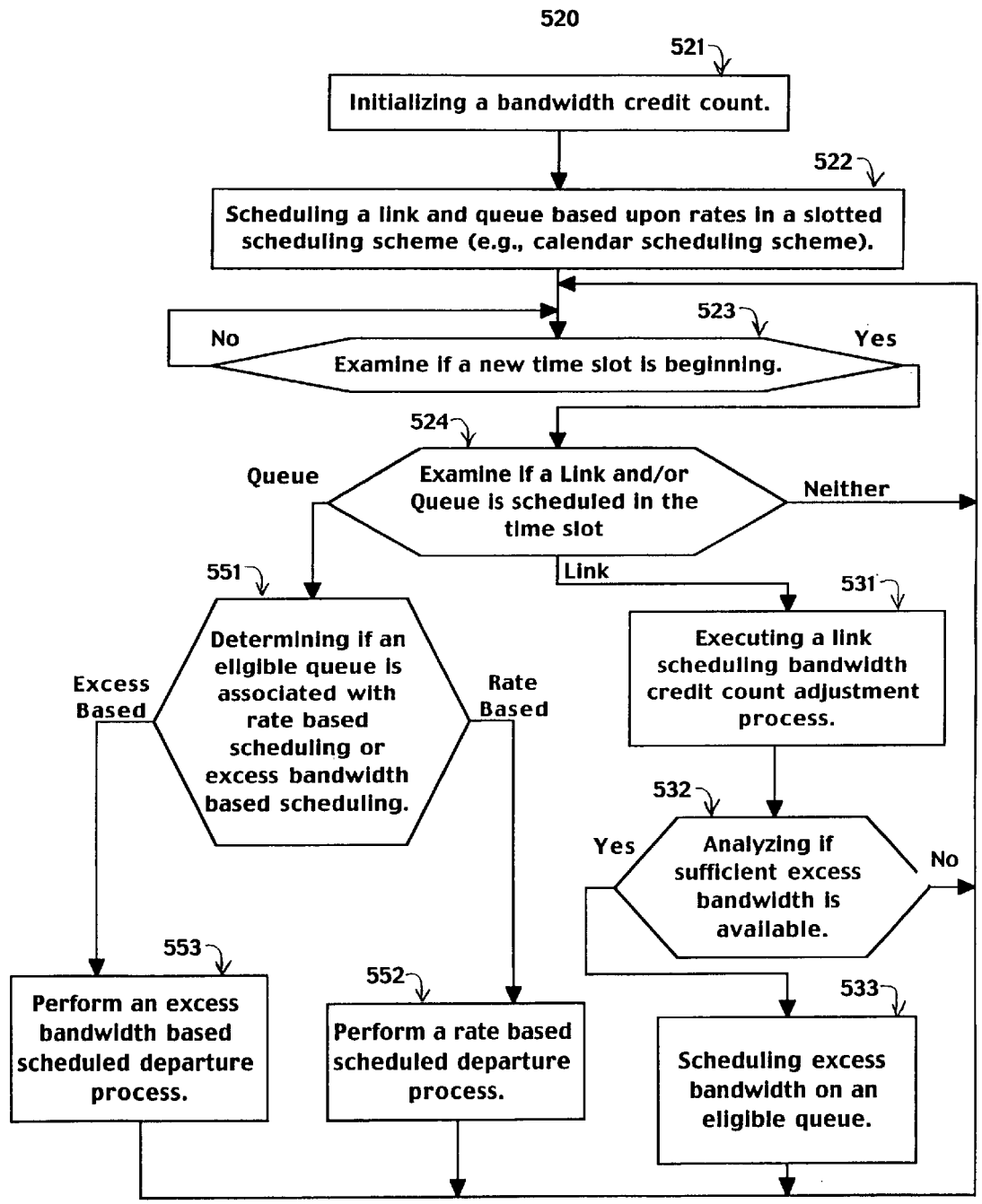
FIG. 5B is a flow chart of an another information communication routing method in accordance with one embodiment of the present invention.

FIG. 5B is a flow chart of information communication routing method 520 in accordance with one embodiment of the present invention. In one embodiment of the present invention, information communication routing method 520 measures free bandwidth on a scheduled link dynamically and distributes the free bandwidth to a queue.

In step 521, a bandwidth credit count is initialized to zero. In one embodiment of the present invention, step 521 is performed upon a power up and/or reset operation. In one exemplary implementation, the bandwidth credit count is a bandwidth availability tracking value.

In step 522, a link and queues are scheduled based upon a rate (e.g., rate based scheduled) in a slotted scheduling scheme (e.g., slotted scheduling scheme 501). In one embodiment of the present invention, the slotted scheduling scheme is a calendar scheduling scheme. For example, the slotted scheduling scheme includes a plurality of slots that are associated with a time period (e.g., 50 nano seconds, 1 second, etc.). In one exemplary implementation, the queues are scheduled in the slots based upon a plurality of rates (e.g., r1, r2, r3, . . . rn). For example, if a queue is associated with a rate of 1,000 bits per second, calendar scheduling slots are associated with a time period of 1 millisecond and an information packet includes 10,000 bits, the queue is scheduled every 10 slots. In one embodiment, the link scheduling is virtual since there is no data queued directly for the link. The link is scheduled in the slots based upon a fixed packet size and fixed rate (e.g., the maximum cumulative rate capacity of the link).

In step 523 a determination is made if a new time slot is beginning. The examination is repeatedly performed until a determination is made that a new time slot is beginning. When a new time slot is beginning the process proceeds to step 524.

In step 524, an examination is made if a link and/or queue is scheduled in a new time slot. For example, a determination is made if a link and or queue is scheduled for departure during the new time slot period. In one embodiment, the process returns to step 523 if link and/or queue is not scheduled. The process proceeds to step 531 if a link is scheduled in the time slot and to 551 if a queue is scheduled in the time slot.

In step 531, a link scheduling bandwidth credit count adjustment process is executed if a link is eligible. In one embodiment of the present invention, a link scheduling bandwidth credit count adjustment process includes incrementing a bandwidth credit count by a link packet size (e.g., predetermined fixed link packet size). The link is rescheduled for another slot based on the link packet size and the link rate (e.g., maximum link rate).

In step 532, a analysis is made if sufficient excess bandwidth is available to schedule a queue for the excess bandwidth. In one embodiment, a determination is made if the bandwidth credit count exceeds a predetermined threshold value (e.g., is positive 128 bytes, 256 bytes, etc.). If the bandwidth credit count is greater than a threshold value an eligibility assignment process is performed and the resulting assigned eligible queue is excess based scheduled.

In step 533, excess bandwidth is assigned to an eligible queue and scheduled in a time slot. In one embodiment, a scheduling eligibility examination is performed. For example, queues and a link are checked for scheduling eligibility. It is appreciated that various factors can be included in the eligibility determination (e.g., a weight distribution analysis or algorithm).

In step 551, a determination is made if an eligible queue is associated with rate based scheduling or excess based scheduling. If the eligible queue is associated with rate based scheduling the process proceeds to step 552. If the eligible queue is associated with excess based scheduling then the process proceeds to step 553.

In step 552, a rate based schedule process is performed if the eligible queue is rate based scheduled. The packet is departed and the bandwidth credit count is decreased by the size of the departed packet. The queue is rescheduled. For example, in the queue reschedule process the next departure time slot is determined and scheduled based upon the rate and size of the packet that is departed.

In step 553, an excess bandwidth based schedule process is performed if the eligible queue is excess based scheduled. The queue packet is departed on the link and the bandwidth credit count is decreased by the departed packet size.

Thus, the present invention provides efficient and convenient utilization of available bandwidth and facilitates conservation of resources. The present system and method provide a flexible scheduling scheme which permits dynamic distribution of available bandwidth of a link or port to corresponding queues. The present scheduling scheme can be readily adapted to a variety of multi-level hierarchical scheduling schemes, including at a node level, port level, class of service, and/or flow level. In one embodiment, the present invention further facilitates conservation of resources by utilizing one calendar to implement the multi-level hierarchical scheduling.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A router system comprising:
a port for communicating information;
a plurality of queues for queuing said information, said plurality of queues coupled to said port; and
a processor for
initializing a bandwidth credit count to zero,
scheduling a link and the plurality of queues in a calendar scheduling scheme,
determining if a new time slot is beginning,
examining if said link and/or one of said plurality of queues is scheduled in said new time slot,
executing a link scheduling bandwidth credit count adjustment process if said link is eligible,
analyzing if excess bandwidth is available to schedule one of said plurality of queues for said excess bandwidth,
scheduling said excess bandwidth to an eligible one of said plurality of queues,
determining if one of said plurality of queues is associated with rate based scheduling or excess based scheduling,
performing a rate based schedule process if said one of said plurality of queues is rate based scheduled, and
performing an excess bandwidth based schedule process if said one of said plurality of queue is excess based scheduled, said processor coupled to said plurality of queue buffers.

2. A router system of claim 1 wherein said rate based schedule process includes decreasing said bandwidth credit count by a departed packed size and rescheduling said one of said plurality of queues.

3. A router system of claim 1 wherein said link is scheduled in a calendar based scheduler based upon a fixed packet size and a fixed communication rate and is the plurality of queues are scheduled in said calendar based scheduler based upon a serviced packet size and an actual communication rate.

4. A router system of claim 1 further comprising a register for storing the bandwidth credit count, wherein said bandwidth credit count provides dynamic indication of available link bandwidth.

5. A router system of claim 1 wherein information from the eligible one of said plurality of queues is communicated via said link if said bandwidth credit count above a predetermined threshold.

6. A router system of claim 1 wherein said link scheduling bandwidth credit count adjustment process includes increasing the bandwidth credit count when said link is scheduled and decreasing the bandwidth credit count when a queue is scheduled.

7. A computer readable medium with instructions embedded therein for causing one or more processors to implement a free bandwidth utilization process including:
   initializing a bandwidth credit count to zero;
   scheduling a link and a plurality of queues in a calendar scheduling scheme;
   determining if a new time slot is beginning;
   examining if said link and/or one of said plurality of queues is scheduled in said new time slot;
   executing a link scheduling bandwidth credit count adjustment process if said link is eligible;
   analyzing if excess bandwidth is available to schedule one of said plurality of queues for said excess bandwidth;
   scheduling said excess bandwidth to an eligible one of said plurality of queues;
   determining if one of said plurality of queues is associated with rate based scheduling or excess based scheduling;
   performing a rate based schedule process if said one of said plurality of queues is rate based scheduled; and
   performing an excess bandwidth based schedule process if said one of said plurality of queue is excess based scheduled.

8. The computer readable medium of claim 7 further comprising:
   selecting an eligible queue for distribution of the excess bandwidth based upon a weight distribution algorithm.

9. The computer readable medium of claim 7 wherein said rate based schedule process includes decreasing said bandwidth credit count by a departed packed size and rescheduling said one of said plurality of queues.

10. The computer readable medium of claim 7 wherein said link scheduling bandwidth credit count adjustment process comprises:
    increasing the bandwidth credit count by a first packet size at a beginning of a link time slot; and
    decreasing said bandwidth credit count by a second packet size if a queue is scheduled in the link time slot, the second packet size containing information from the queue; and
    the bandwidth credit count indicating available bandwidth on the link.

11. The computer readable medium of claim 7 wherein information from the eligible one of said plurality of queues is communicated via said link if said bandwidth credit count is above a predetermined threshold and said bandwidth credit count is reduced by a size of said information departed from said eligible queue.

12. An information communication routing system comprising:
    means for communicating output of information on a network via a link;
    means for queuing said information in a plurality of queues;
    means for initializing a bandwidth credit count to zero;
    means for scheduling the link and the plurality of queues in a calendar scheduling scheme;
    means for determining if a new time slot is beginning;
    means for examining if said link and/or one of said plurality of queues is scheduled in said new time slot;
    means for executing a link scheduling bandwidth credit count adjustment process if said link is eligible;
    means for analyzing if excess bandwidth is available to schedule one of said plurality of queues for said excess bandwidth;
    means for scheduling said excess bandwidth to an eligible one of said plurality of queues;
    means for determining if one of said plurality of queues is associated with rate based scheduling or excess based scheduling;
    means for performing a rate based schedule process if said one of said plurality of queues is rate based scheduled; and
    means for performing an excess bandwidth based schedule process if said one of said plurality of queue is excess based scheduled.

13. An information communication routing system of claim 12 wherein said means for scheduling the link and the plurality of queues in a calendar scheduling scheme schedules the link in a calendar based scheduler based upon a fixed packet size and a fixed communication rate and schedules the plurality of queues in said calendar based scheduler based upon a serviced packet size and an actual communication rate.

14. An information communication routing system of claim 12 wherein said means for scheduling said excess bandwidth to an eligible one of said plurality of queues includes tracking the bandwidth credit count and dynamically assigns bandwidth to said means for queuing said information if said bandwidth credit count is above a predetermined threshold indicating bandwidth is available on the link.

15. An information communication routing method comprising:
    initializing a bandwidth credit count to zero;
    scheduling a link and a plurality of queues in a calendar scheduling scheme;
    determining if a new time slot is beginning;
    examining if said link and/or one of said plurality of queues is scheduled in said new time slot;
    executing a link scheduling bandwidth credit count adjustment process if said link is eligible;
    analyzing if sufficient excess bandwidth is available to schedule one of said plurality of queues for said excess bandwidth;
    scheduling said excess bandwidth to an eligible one of said plurality of queues;
    determining if one of said plurality of queues is associated with rate based scheduling or excess based scheduling;
    performing a rate based schedule process if said one of said plurality of queues is rate based scheduled; and
    performing an excess bandwidth based schedule process if said one of said plurality of queue is excess based scheduled.

16. An information communication routing method of claim 15 wherein said link is scheduled based upon a fixed rate and predetermined packet size.

17. An information communication routing method of claim 15 wherein said rate based schedule process includes decreasing said bandwidth credit count by a departed packed size and rescheduling said one of said plurality of queues.

18. An information communication routing method of claim 15 wherein said excess bandwidth based schedule process includes departing a packet on said link and decreasing said bandwidth credit count by a packet size of said departed packet.

19. An information communication routing method of claim 15, wherein the link scheduling bandwidth credit count adjustment process comprises:
- adding a first packet size to the bandwidth credit count whenever a link slot time is scheduled;
- subtracting a second packet size from the bandwidth credit count whenever a first queue is scheduled, the second packet size containing information from the first queue; and
- the bandwidth credit count indicating available bandwidth on the link.

20. An information communication routing method of claim 15 further comprising rescheduling the link in a calendar scheduling scheme, wherein the link rescheduling is based upon a fixed packet size and a fixed rate.

21. An information communication routing method of claim 19 further comprising rescheduling said first queue in a calendar scheduling scheme, wherein said first queue rescheduling is based upon a size of a packet serviced and a connection rate.

22. An information communication routing method of claim 15 further comprising selecting the eligible one of the plurality of queues based upon a weight distribution algorithm.

23. An information communication routing method of claim 15 further comprising forwarding information from the eligible one of the plurality of queues on a network if the bandwidth credit count is above a predetermined threshold.

* * * * *

UNITED STATES PATENT AND TRADEMARK OFFICE
CERTIFICATE OF CORRECTION

PATENT NO. : 7,324,554 B1  
APPLICATION NO. : 10/702997  
DATED : January 29, 2008  
INVENTOR(S) : Hariprasad Ginjpalli et al.

Page 1 of 1

It is certified that error appears in the above-identified patent and that said Letters Patent is hereby corrected as shown below:

Column 8, Line 60, delete "packed" and insert -- packet --, therefor.

Column 8, Line 64, after "rate and" delete "is".

Column 9, Line 7, after "credit" insert -- is --.

Column 9, Line 42, delete "packed" and insert -- packet --, therefor.

Column 10, Line 66, delete "packed" and insert -- packet --, therefor.

Signed and Sealed this

Twenty-second Day of December, 2009

David J. Kappos  
*Director of the United States Patent and Trademark Office*